(12) United States Patent
Wang et al.

(10) Patent No.: US 11,928,136 B2
(45) Date of Patent: Mar. 12, 2024

(54) COMPUTING NETWORKS AND SYSTEMS FOR TRACKING DATA

(71) Applicant: Veeva Systems Inc., Pleasanton, CA (US)

(72) Inventors: Ying Zhou Wang, Toronto (CA); Marius K. Mortensen, Burlington (CA); Asaf Roll, Richmond Hill (CA)

(73) Assignee: Veeva Systems Inc., Pleasanton, CA (US)

( * ) Notice: Subject to any disclaimer, the term of this patent is extended or adjusted under 35 U.S.C. 154(b) by 113 days.

(21) Appl. No.: 17/227,103

(22) Filed: Apr. 9, 2021

(65) Prior Publication Data

US 2022/0327146 A1    Oct. 13, 2022

(51) Int. Cl.
*G06F 16/28* (2019.01)
*G06F 16/22* (2019.01)
*G06F 16/242* (2019.01)
*G06F 16/2458* (2019.01)
*G06F 16/25* (2019.01)

(52) U.S. Cl.
CPC ........ *G06F 16/287* (2019.01); *G06F 16/2282* (2019.01); *G06F 16/2423* (2019.01); *G06F 16/2474* (2019.01); *G06F 16/256* (2019.01)

(58) Field of Classification Search
CPC .. G06F 16/287; G06F 16/2282; G06F 16/256; G06F 16/2474; G06F 16/2423
See application file for complete search history.

(56) References Cited

U.S. PATENT DOCUMENTS

| | | | |
|---|---|---|---|
| 8,423,905 B2* | 4/2013 | Li | H04M 1/2748 707/706 |
| 10,009,391 B1* | 6/2018 | Smith | G06F 16/2477 |
| 10,754,741 B1* | 8/2020 | Sethuramalingam | G06F 9/4856 |
| 10,860,621 B1* | 12/2020 | Ross | G16H 10/60 |
| 10,997,243 B1* | 5/2021 | Paulus | G06F 16/24568 |
| 2006/0004688 A1* | 1/2006 | Scanlon | G06Q 10/06 |
| 2008/0005182 A1* | 1/2008 | Gauthier | G06Q 40/00 |
| 2011/0247080 A1* | 10/2011 | Claussen | G06F 21/6218 726/28 |
| 2012/0179825 A1* | 7/2012 | Dhoolia | G06F 15/16 709/226 |
| 2012/0185791 A1* | 7/2012 | Claussen | G06Q 10/063 715/772 |
| 2014/0095442 A1* | 4/2014 | Guo | G06F 16/22 707/661 |
| 2015/0081572 A1* | 3/2015 | Thomas | G06F 9/44505 705/305 |

(Continued)

*Primary Examiner* — Vaishali Shah
(74) *Attorney, Agent, or Firm* — Baker & McKenzie LLP

(57) ABSTRACT

Systems and methods are provided for tracking data in a computer network. An exemplary method includes: storing a first data in the one or more data servers; receiving a first request to aggregate the first data; aggregating a first set of the first data; analyzing one or more fields of each of the first set of the first data; removing the one or more first data elements from the first set of the first data; generating a second set of the first data; aggregating the second set of the first data; retrieving information associated with the aggregation of the second set of the first data; and generating one or more reports using the retrieved information associated with the aggregation of the second set of the first data.

18 Claims, 13 Drawing Sheets

(56) References Cited

U.S. PATENT DOCUMENTS

| | | | |
|---|---|---|---|
| 2016/0078235 A1* | 3/2016 | Morita | G06F 21/604 |
| | | | 726/1 |
| 2019/0102386 A1* | 4/2019 | Bell | G06F 16/2474 |
| 2019/0251295 A1* | 8/2019 | Vieyra | H04L 9/30 |
| 2020/0234242 A1* | 7/2020 | Parks | G06F 8/34 |
| 2021/0027458 A1* | 1/2021 | Chor | G06F 16/5838 |
| 2021/0390421 A1* | 12/2021 | Rocha | G06F 16/219 |

* cited by examiner

FIG. 3

Details

- Case Number: 0000V0 — 304
- AER: AER000012 — 306
- Report Type*: — 308
- Receipt Date*: — 310
- New Info Data: — 312
- Due Date: — 314
- Source Document: — 316
- Version*: — 318
- Watchlist Tags: — 320
- Suppress Submission — 321

- Event (PT): — 322
- Seriousness: — 324
- Expectedness: Yes ◉  No ○ — 326
- Relatedness: Unknown — 328
- Expedited: Yes ◉  No ○ — 330
- CIOMS Remarks: — 332

| STUDY SELECTOR | | | | | | | | | | | |
|---|---|---|---|---|---|---|---|---|---|---|---|
| All Studies | | | | | | | | | | | 1-5 of 5 |
| ▶ VIEWS ✏ — 404 | | | | | | | | | | | |
| ☐ All Cases — 404a | | | | | | | | | | | |
| ⏱ Recent Cases — 404b | | | | | | | | | | | |
| ☆ Favorites — 404c | | | | | | | | | | | |
| FILTERS — 406 | All Cases ○ Save View As | | | | | | | | | | |
| ▲ DUE DATE — 406a | Name ▲ | Lifecycle State | Suppress Submission | Approval Date | Due Date | Receipt Date | New Info Date | Report Type | Study | Product | Event (PT) | Serious -ness | Related -ness |
| ▲ RECEIPT DATE — 406b | N1 | ⚙ L1 | ☐ SUPP1 | AD1 | DD1 | RD1 | NID1 | RT1 | ST1 | P1 | E1 | SR1 | R1 |
| ▲ NEW INFO DATE — 406c | N2 | L2 | ☐ SUPP2 | AD2 | DD2 | RD2 | NID2 | RT2 | ST2 | P2 | E2 | SR2 | R2 |
| ▲ REPORT TYPE — 406d | N3 | Nullified | ☑ SUPP3 | AD3 | DD3 | RD3 | NID3 | RT3 | ST3 | P3 | E3 | SR3 | R3 |
| ▲ STUDY — 406e | N4 | L3 | ☐ SUPP4 | AD4 | DD4 | RD4 | NID4 | RT4 | ST4 | P4 | E4 | SR4 | R4 |
| ▲ PRODUCT — 406f | N5 | L4 | ☐ SUPP5 | AD5 | DD5 | RD5 | NID5 | RT5 | ST5 | P5 | E5 | SR5 | R5 |
| ▲ SERIOUSNESS — 406g | | | | | | | | | | | |
| ▲ RELATEDNESS — 406h | | | | | | | | | | | |

COMPUTING NETWORKS AND SYSTEMS FOR TRACKING DATA

TECHNICAL FIELD

The present disclosure relates to methods and systems for accessing, tracking, and sharing data using complex computing networks and systems.

BACKGROUND

Researchers, scientists, industry players, academics, government regulators, and other stakeholders are increasingly in need of tracking data across a vast area of computer networks.

SUMMARY

According to one aspect of the subject matter described in this disclosure, a method for managing and accessing data using one or more data servers is provided. The method includes the following: receiving, using one or more computing device processors, an initial request to store a first data at one or more data servers; storing, using the one or more computing device processors, the first data in the one or more data servers; receiving, using the one or more computing device processors, the first data from one or more external sources; analyzing, using the one or more computing device processors, the first data to assign to one or more content information; analyzing, using the one or more computing device processors, one or more fields of the first data to determine if the first data includes a first parameter; in response to determining the first data includes the first parameter, storing, using the one or more computing device processors, a first marker in the one or more data servers indicating the first data includes the first parameter; receiving, using the one or more computing device processors, a first request to aggregate the first data, wherein the first request includes a first information for aggregating the first data; aggregating, using the one or more computing device processors and the first information, a first set of the first data; analyzing, using the one or more computing device processors, one or more content information of each of the first set of the first data to determine the one or more content information of each of the first set of the first data is in accordance with the first information; in response to the one or more content information of each of the first set of the first data being in accordance with the first information, analyzing, using the one or more computing device processors, one or more fields of each of the first set of the first data to determine one or more first data elements of the first set include the first parameter; in response to determining the one or more first data elements of the first set include the first parameter, removing, using the one or more computing device processors, the one or more first data elements from the first set of the first data; generating, using the one or more computing device processors, a second set of the first data, wherein the second set of the first data includes one or more first data elements in the first set of the first data that do not include the first parameter; aggregating, using the one or more computing device processors and the first information, the second set of the first data; retrieving, using the one or more computing device processors, information associated with the aggregation of the second set of the first data from the one or more data servers; and generating, using the one or more computing device processors, one or more reports using the retrieved information associated with the aggregation of the second set of the first data.

According to another aspect of the subject matter described in this disclosure, a system for managing and accessing data using one or more data servers is provided. The system includes one or more computing device processors. One or more computing device memories are coupled to the one or more computing device processors. The one or more computing device memories store instructions executed by the one or more computing device processors, the instructions are configured to: receive an initial request to store a first data at one or more data servers; store the first data in the one or more data servers; receive the first data from one or more external sources; analyze the first data to assign to one or more content information; analyze one or more fields of the first data to determine if the first data includes a first parameter; in response to determining the first data includes the first parameter, store a first marker in the one or more data servers indicating the first data includes the first parameter; receive a first request to aggregate the first data, wherein the first request includes a first information for aggregating the first data; aggregate, using the first information, a first set of the first data; analyze one or more content information of each of the first set of the first data to determine the one or more content information of each of the first set of the first data is in accordance with the first information; in response to the one or more content information of each of the first set of the first data being in accordance with the first information, analyze one or more fields of each of the first set of the first data to determine one or more first data elements of the first set include the first parameter; in response to determining the one or more first data elements of the first set include the first parameter, remove the one or more first data elements from the first set of the first data; generate a second set of the first data, wherein the second set of the first data includes one or more first data elements in the first set of the first data that do not include the first parameter; aggregate the second set of the first data; retrieve information associated with the aggregation of the second set of the first data from the one or more data servers; and generate one or more reports using the retrieved information associated with the aggregation of the second set of the first data.

According to another aspect of the subject matter described in this disclosure, a method for tracking data in a computer network is provided. The method includes the following: storing, using one or more computing device processors, a first data at one or more data cloud servers; analyzing, using the one or more computing device processors, the first data to assign to one or more content information; analyzing, using the one or more computing device processors, one or more fields of the first data to determine if the first data includes a first parameter; in response to determining the first data includes the first parameter, storing, using the one or more computing device processors, a first marker in the one or more data cloud servers indicating the first data includes the first parameter; receiving, using the one or more computing device processors, a first request to aggregate the first data, wherein the first request includes a first information for aggregating the first data; aggregating, using the one or more computing device processors and the first information, a first set of the first data; analyzing, using the one or more computing device processors, one or more content information of each of the first set of the first data to determine the one or more content information of each of the first set of the first data is in accordance with the first information; in response to the one or more content information of each of the first set of the first data being in accordance with the first information, analyzing, using the one or more computing device processors, one or more fields of each of the first set of the first data to determine one or more first data elements of the first set include the first parameter; in response to determining the one or more first data elements of the first set include the first parameter, removing, using the one or more computing device processors, the one or more first data elements from the first set of the first data; generating, using the one or more computing device processors, a second set of the first data, wherein the second set of the first data includes one or more first data elements in the first set of the first data that do not include the first parameter; aggregating, using the one or more computing device processors and the first information, the second set of the first data; retrieving, using the one or more computing device processors, information associated with the aggregation of the second set of the first data from the one or more data cloud servers; and generating, using the one or more computing device processors, one or more reports using the retrieved information associated with the aggregation of the second set of the first data.

BRIEF DESCRIPTION OF THE DRAWINGS

The disclosure is illustrated by way of example, and not by way of limitation in the figures of the accompanying drawings in which like reference numerals are used to refer to similar elements. The various elements shown in the figures that follow may be optional depending on a given embodiment without departing from the principles provided in this disclosure.

FIG. 3 shows an example interface used to devise a new case to be stored in a data could server, according to one embodiment.

FIG. 4 shows an example interface listing all cases including their corresponding content information, according to one embodiment.

FIG. 10 shows an example interface for filtering cases using the suppress submission field, according to one embodiment.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context.

System Environment

Figure 1:
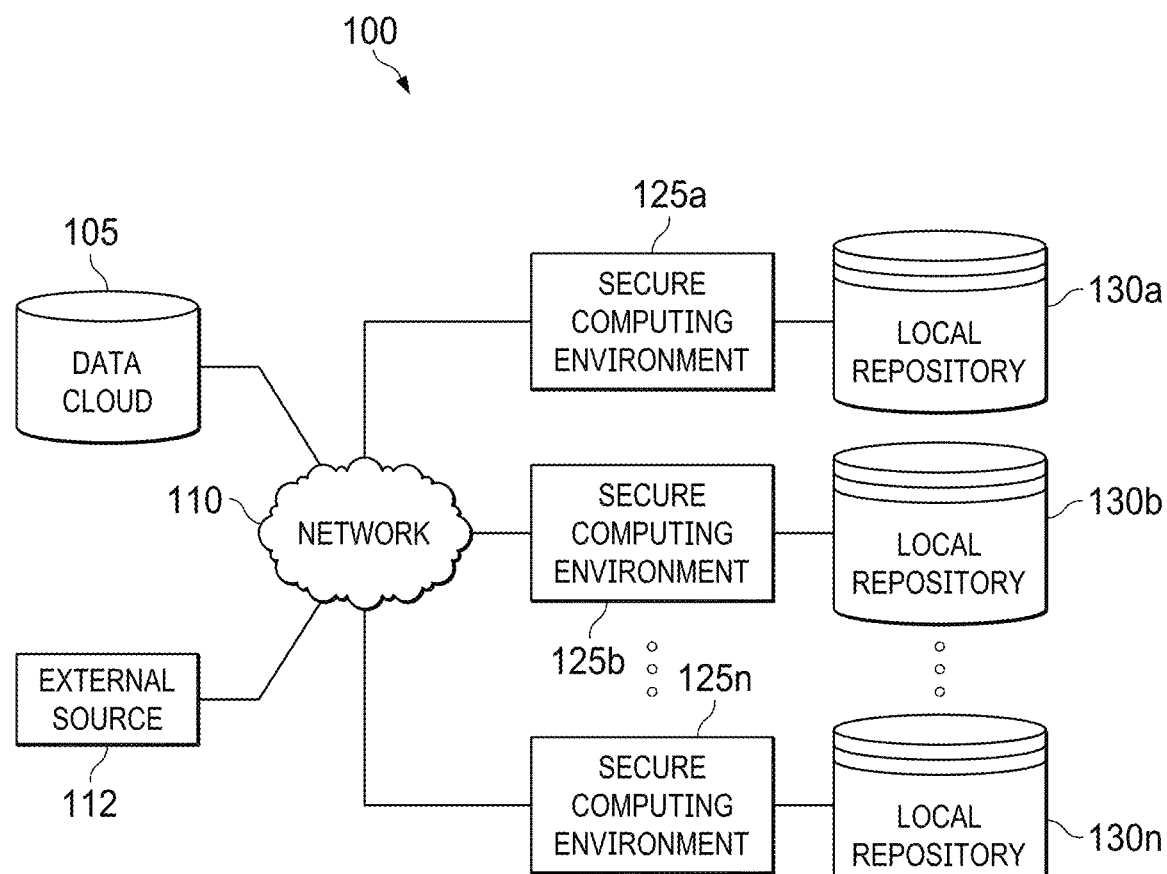
FIG. 1 is a high-level network system for accessing, managing, and sharing structured data, according to one embodiment.

Illustrated in FIG. 1 is a high level network system 100 for generating interfaces that access, maintain, analyze, and display structured data. In the depicted implementation, the system 100 may include a data cloud server 105 communicatively coupled to a plurality of secure computing environments 125 external sources 112 via the network 110. The secure computing environments 125 may in turn be communicatively coupled to a local repository 130. While a single data cloud server 105 is illustrated, the disclosed principles and techniques could be expanded to include multiple data cloud servers 105.

The data cloud server 105, according to some embodiments, is configured to store a plurality of structured data in a secure environment requiring authentication before access is granted to the structured data. According to one implementation, the structured data includes hierarchical data having varying and connected categories/levels that describe a plurality of aspects of the structured data. In some cases, the structured data in the data cloud server 105 is sourced or obtained from third-party scientific sources, and/or from third-party regulatory agencies, and/or from academic sources, and/or from industrial sources, etc.

In addition, the data cloud server 105 may be configured to manage or otherwise maintain the integrity and/or version updates of the structured data so that a user (e.g., a user of the secure computing environment) does not have to deal with such data maintenance processes as the structured data changes and/or grows. In one embodiment, the data cloud server 105 provides the most current version of the structured data to a user of the system. In other embodiments, the data cloud server 105 can also provide historical versions of the structured data when necessary or needed. Furthermore, the data cloud server 105 may include mechanisms that execute operations of data decompression operations, data decryption operations, and data decoding operations associated with the structured data so that the user is effectively isolated from such operations.

Moreover, the data cloud server 105 allows for easy associating, tagging, or coding of information for retrieval purposes. In some cases, the tagging or coding is automatically executed by the data cloud server 105. In addition, the data cloud server 105 allows a user (e.g., user of the secure computing environment 125) to transition from accessing structured data from the local repository 130 to the data cloud server 105.

The data cloud server 105 may be implemented within a computing device such as a mainframe server, a content server, a communication server, a laptop computer, a desktop computer, a handheld computing device, a virtual machine, a cloud-based computing solution and/or service, and/or the like. The data cloud server 105 may include a plurality of computing devices configured to communicate with one another and/or implement the techniques described herein. In some instances, the data cloud server 105 may include various elements of a computing environment as described with reference to FIGS. 2A and/or 2B. For example, the data cloud server 105 may include a processing system 202, a memory 204, an input/output (I/O) system 206, and a communication system 208. A user (e.g., database administrator) may operate/maintain the data cloud server 105 either locally or remotely as the case may require.

The data cloud server 105 may be configured to have storage logic that is executable to store structured data that is shared across multiple secure computing environments 125. According to one implementation, the data cloud server 105 may include a plurality of non-volatile/non-transitory storage media such as solid state storage media, hard disk storage media, virtual storage media, cloud-based storage drives, storage servers, and/or the like. The plurality of storage media may be configured to store data from a plurality of sources. For example, the data cloud server 105 may include storage logic that is executable to store structured data derived from, for example, medical data, research data, education data, government data, etc. According to some implementations, the storage logic of the data cloud server 105 may be configured to automatically monitor and/or update relevant structured data obtained from a third-party source. For example, the storage logic of the data cloud server 105 may periodically monitor updates associated with structured data (e.g., dictionary of medical terms for research and regulatory purposes) from third-party organizations/sources and automatically update different versions of the structured data within one or more storage media of the data cloud server 105. In one embodiment, the storage logic of the data cloud server 105 manipulates or otherwise formats the structured data such that user interfaces generated by a secure computing environment 125 can seamlessly access/retrieve and present the structured data to a user. In addition, structured data from the data cloud server 105 may be accessed on a regulated basis via credential access, for example. This regulated basis may be determined, in part, by licenses, privileges, and other levels of authorization dictated by a user's credentials.

The external source 112 may operate similarly like the data cloud server 105 including having all the technical features of the data cloud server 105 described herein. The difference between the external source 112 and the data cloud server 105 is the external source 112 operates in providing information to the data cloud server 105 when requested. While a single external source 112 is illustrated, the disclosed principles and techniques could be expanded to include multiple external sources 112.

The local repository 130 may include storage logic for storing a local copy of structured data from the data cloud server 105. The local repository 130 may also be configured to store data other than the structured data. For example, the local repository 130 may store data from third-party sources and other data generated by the secure computing environment 125. The local repository may include a plurality of non-volatile/non-transitory storage media such as solid state storage media, hard disk storage media, virtual storage media, cloud-based storage drives, storage servers, and/or the like. According to some embodiments, the local repository 130 may include logic that updates structured data stored within its storage devices based on updates to structured data stored within the data cloud server 105. In some cases, snapshots of structured data may be accessed using the secure computing environment 125 so that updates associated with the snapshots may be effected on the local repository 130.

As previously discussed, the network 110 facilitates communication between the data cloud server 105, the external source 112, and the secure computing environment 125. The network 110 may also allow different secure computing environments 125 to communicate with each other. According to one embodiment, the network 110 may include a plurality of networks. For instance, the network 110 may include any wired/wireless communication network that facilitates communication between the components of the network system 100. The network 110, in some instances, may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a fiber optics network, a laser-based network, and/or the like.

The secure computing environment 125 is configured to generate one or more user interfaces for accessing, analyzing, and displaying the structured data. According to some implementations, the secure computing environment 125 includes functionalities and/or enhanced security features that allow a user to securely access and/or securely manage structured data. As shown more clearly in the exemplary functional and system diagrams of FIGS. 2A and 2B, the secure computing environment 125 includes a processing system 202, a memory 204, and I/O system 206, and a communication system 208. The processing system 202, the memory 204, the I/O system 206, and the communication system 208 may include one or more subsystems that perform one or more of the operations described herein. Additionally, each system of the secure computing environment 125 may be operatively and/or otherwise communicatively coupled with each other so as to facilitate one or more operations described herein. The secure computing environment 125 may include general hardware, specifically-purposed hardware, and/or a combination thereof.

Figure 2A:
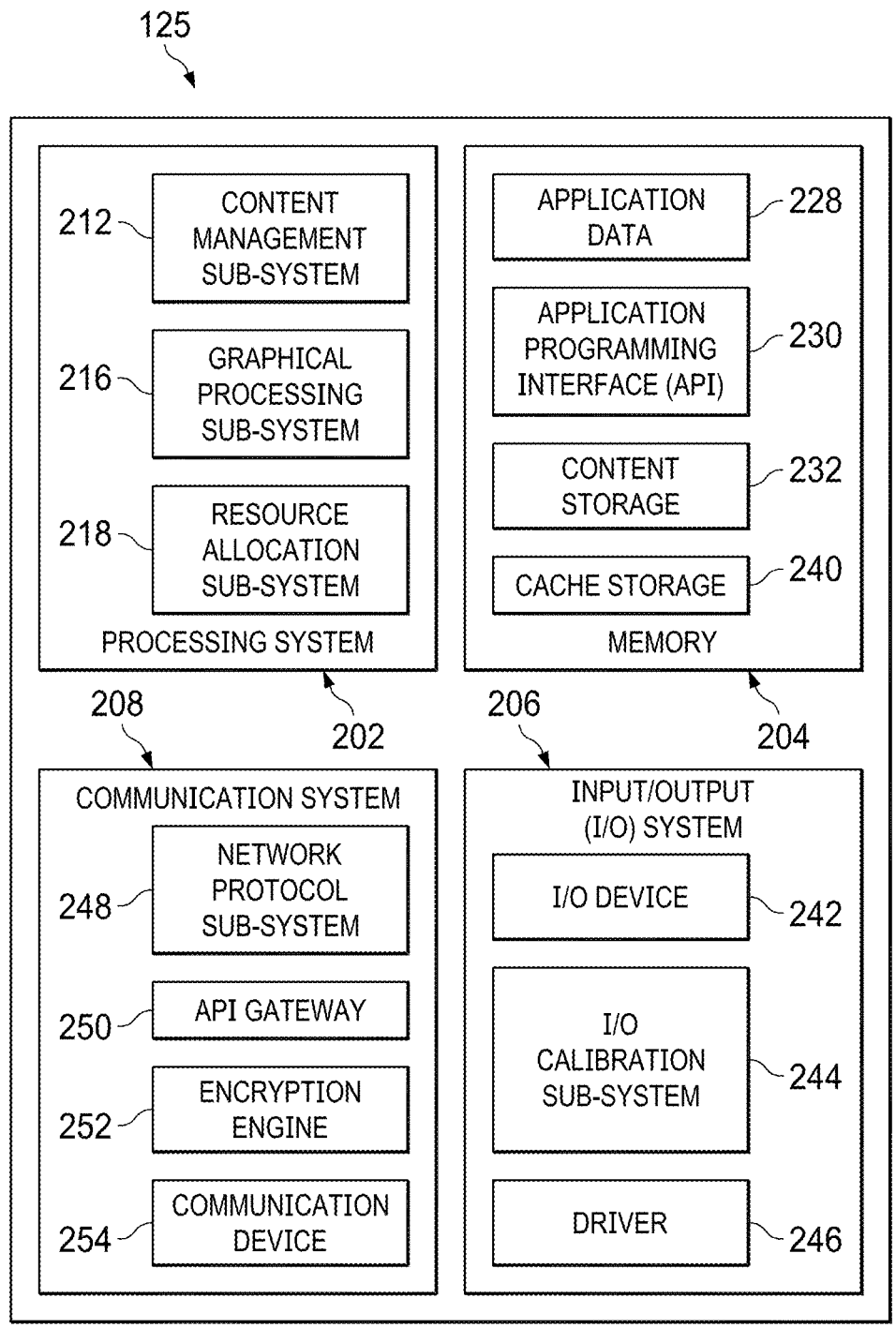
FIG. 2A is a functional block diagram of a computing environment for accessing and visualizing structured data, according to one embodiment.
Figure 2B:
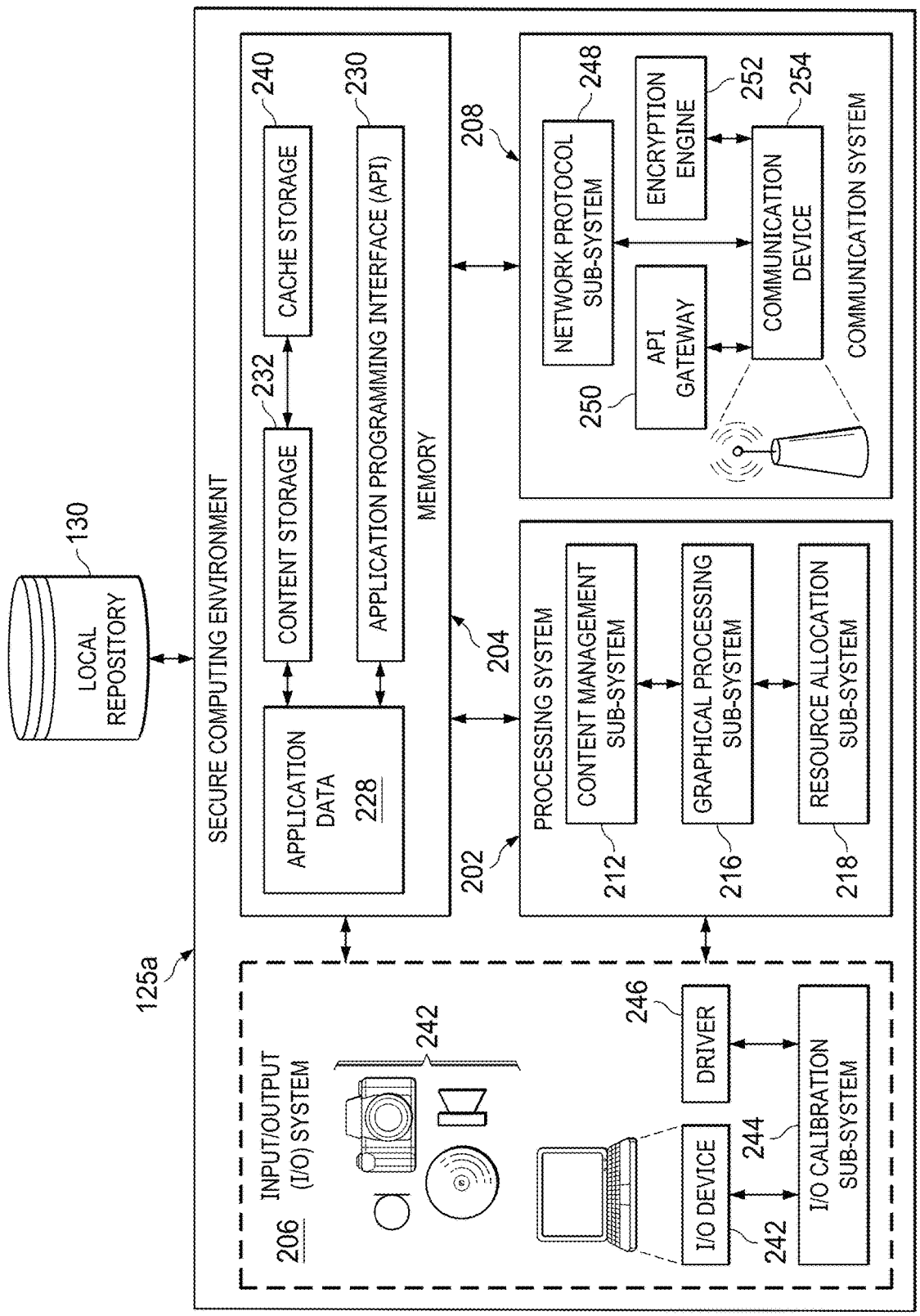
FIG. 2B is a detailed system diagram of FIG. 2A, according to one embodiment.

The processing system 202 may control the memory 204, the I/O system 206, and the communication system 208, as well as any included subsystems, elements, components, devices, and/or functions performed by the memory 204, I/O system 206, and the communication system 208. Additionally, any actions described in this disclosure as being performed by a processor or one or more processors of a computing device or one or more computing device processors and/or one or more computing system processors may be executed by the processing system 202 of FIGS. 2A and 2B. Further, while one processing system 202 is shown in FIGS. 2A and 2B, multiple processing systems may be present and/or otherwise included in the secure computing environment 125 or elsewhere in the overall network system 100 of FIG. 1. Thus, while instructions may be described as being executed by the processing system 202 (and/or various subsystems of the processing system 202), the instructions may be executed simultaneously, serially, and/or otherwise by one or multiple processing systems 202 on one or more computing devices.

According to one embodiment, the processing system 202 may be implemented as one or more computer processor chips and/or graphical processing unit (GPU) chips and may include a hardware device capable of executing computer instructions. The processing system 202 may execute instructions, codes, computer programs, and/or scripts. The instructions, codes, computer programs, and/or scripts may be received from the I/O system 206, the communication system 208, and/or stored in the memory 204, and/or received from the other subsystems of the secure computing environment 125 and/or received from other computing environments.

In some embodiments, the processing system 202 may include subsystems such as a content management subsystem 212, a graphical processing subsystem 216, and a resource allocation subsystem 218. Each of the aforementioned subsystems of the processing system 202 may be communicatively or operably coupled to each other.

The content management sub-system 212 may facilitate generation, modification, analysis, transmission, and/or presentation of content. Content may be file content, media content, structured data content, user interfaces, or any combination thereof. In some instances, content on which the content management system 212 operates includes structured data from the data cloud server 105, structured data from the local repository 130, user interface data, device information, images, text, themes, audio files, video files, documents, and/or the like. Additionally, the content management subsystem 212 may control the audio-visual environment and/or appearance of application data during execution of various processes. In some embodiments, the content management subsystem 212 may interface with a third-party content server and/or third-party memory locations for execution of its operations.

The graphical processing subsystem 216 may facilitate generation, modification, analysis, processing, transmission, and/or presentation of the content described above, as well as any data described herein. In some embodiments, the graphical processing subsystem 216 may be used to render content for presentation on a computing device (e.g., via a graphical user interface of the computing device). The graphical processing subsystem 216 may also include multiple graphical processing subsystems and therefore may be configured to perform and/or execute multiple processes in parallel. In some implementations, the graphical processing subsystem 216 may be used in conjunction with components of the memory 204, the I/O system 206, the communication system 208, and/or a combination thereof.

The resource allocation subsystem 218 may facilitate the determination, monitoring, analysis, and/or allocation of computing resources throughout the secure computing environment 125 and/or other computing environments. Computing resources of the secure computing environment 125 may be used by the processing system 202, the memory 204, the I/O system 206, and/or the communication system 208. These resources may include processing power, data storage space, network bandwidth, and/or the like. Accordingly, the resource allocation subsystem 218 may include sensors and/or other specially-purposed hardware for monitoring performance of each system and/or subsystem of the secure computing environment 125, as well as hardware for responding to the computing-resource needs of each system and/or subsystem. In some embodiments, the resource allocation subsystem 218 may use computing resources of a second secure computing environment separate and distinct from the secure computing environment 125 to facilitate a desired operation.

The memory 204 may be used for storing, recalling, receiving, transmitting, and/or accessing various files and/or data (e.g., structured data) during the operation of the secure computing environment 125. For example, the memory 204 may store, recall, and/or update structured data from the data cloud and/or the local repository as the case may be. In some embodiments, the memory 204 may store instructions and/or data that may be executed by the processing system 202. For instance, the memory 204 may store instructions that execute operations associated with one or more systems and/or one or more subsystems of the secure computing environment 125. For example, the memory 204 may store instructions for the processing system 202, the I/O system 206, the communication system 208, and for itself.

Memory 204 may include various types of data storage media such as solid state storage media, hard disk storage media, virtual storage media, and/or the like. Memory 204 may include dedicated hardware elements such as hard drives and/or servers, as well as software elements such as cloud-based storage drives. In some implementations, memory 204 may be a random access memory (RAM) device, a dynamic random access memory (DRAM) device, a static random access memory (SRAM) device, flash memory, read only memory (ROM) device, and/or various forms of secondary storage. The RAM device may be used to store volatile data and/or to store instructions that may be executed by the processing system 202. For example, the instructions stored may be a command, a current operating state of secure computing environment 125, an intended operating state of secure computing environment 125, and/or the like. As a further example, data stored in the memory 204 may include instructions related to various methods and/or functionalities described herein. The ROM device may be a non-volatile memory device that may have a smaller memory capacity than the memory capacity of a secondary storage of the secure computing environment. The ROM device may be used to store instructions and/or data that may be read during execution of computer instructions. In some embodiments, access to both the RAM device and ROM device may be faster to access than access to the secondary storage of the secure computing environment 125. Secondary storage may comprise one or more disk drives and/or tape drives which may be used for non-volatile/non-transitory storage of data or as an over-flow data storage device of the secure computing environment 125 if the RAM device is not large enough to hold all working data. Secondary storage may be used to store programs that may be loaded into the RAM device when such programs are selected for execution.

Turning back to FIG. 2A, the memory 204 may include subsystems such as application data 228, application programming interface 230, content storage 232, and cache storage 240. Application data 228 may facilitate deployment, storage, access, execution, and/or utilization of an application utilized by the secure computing environment 125 and/or any other computing environments described herein. As such, application data 228 may store any information and/or data associated with an application. Application data 228 may further store various pieces of information and/or data associated with the operation of an application and/or with the secure computing environment 125 as a whole, such as a status of computing resources (e.g., processing power, memory availability, resource utilization, and/or the like), runtime information, user interfaces, systems to direct execution of operations described herein to, user permissions, security credentials, and/or the like.

The application programming interface (API) 230 may facilitate deployment, storage, access, execution, and/or utilization of information associated with APIs of secure computing environment 125 and/or any other computing environment described herein. For example, secure computing environment 125 may include one or more APIs for various devices, applications, systems, subsystems, elements, and/or other computing environments to allow communication between one or more applications associated with the secure computing environment 125. Accordingly, API 230 may include API databases containing information that may be accessed and/or used by applications, systems, subsystems, elements, and/or operating systems of other devices and/or computing environments in communication with the secure computing environment 125. In some cases, the API 230 may enable the data cloud server 105 and the secure computing environment 125 to communicate with each other.

The content storage 232 may facilitate deployment, storage, access, and/or utilization of information associated with structured data as further discussed below. In one embodiment, content storage 232 may communicate with a content management system 212 to receive and/or transmit content (e.g., structured data, media content, etc.).

The I/O system 206 may include hardware and/or software elements for the secure computing environment 125 to receive, and/or transmit, and/or present information useful for generating one or more interfaces for retrieving and displaying structured data according to some embodiments of this disclosure. For example, elements of the I/O system 206 may be used to receive input from a user of the secure computing environment 125. As described herein, I/O system 206 may include subsystems such as I/O device 242, I/O calibration subsystem 244, and/or driver 246.

The I/O device 242 may facilitate the receipt, transmission, processing, presentation, display, input, and/or output of information as a result of executed processes described herein. In some embodiments, the I/O device 242 may include a plurality of I/O devices. In some embodiments, I/O device 242 may include a variety of elements that enable a user to interface with secure computing environment 125. For example, I/O device 242 may include a keyboard, a touchscreen, a button, a sensor, a biometric scanner, a laser, a microphone, a camera, and/or another element for receiving and/or collecting input from a user. Additionally and/or alternatively, I/O device 242 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 242 may communicate with one or more elements of processing system 202 and/or memory 204 to execute operations associated with generating user interfaces for retrieving and visualizing structured data.

The I/O calibration system 244 may facilitate the calibration of the I/O device 242. For example, I/O calibration system 244 may detect and/or determine one or more settings of I/O device 242, and then adjust and/or modify settings so that the I/O device 242 may operate more efficiently. In some embodiments, I/O calibration system 244 may use a driver 246 (or multiple drivers) to calibrate I/O device 242 as needed. For example, driver 246 may include software that is to be installed by I/O calibration system 244 so that an element of secure computing environment 125 (or an element of another computing environment) may recognize and/or integrate with I/O device 242.

The communication system 208 may facilitate establishment, maintenance, monitoring, and/or termination of communications between the secure computing environment 125 and other computing environments, third-party server systems, and/or the like. Communication system 208 may also facilitate internal communications between various elements (e.g., systems and/or subsystems) of secure computing environment 125. In some embodiments, communication system 208 may include a network protocol subsystem 248, an API gateway 250, an encryption engine 252, and/or a communication device 254. These systems and/or subsystems of the communication system 208 may be implemented as hardware, software, or a combination thereof.

The network protocol subsystem 248 may facilitate establishment, maintenance, and/or termination of a communication connection for the secure computing environment 125 via a network (e.g., network 110). For example, network protocol subsystem 248 may detect and/or define a communication protocol required by a particular network and/or network type. Communication protocols utilized by network protocol subsystem 248 may include Wi-Fi protocols, Li-Fi protocols, cellular data network protocols, Bluetooth® protocols, internet protocols, WiMAX protocols, Ethernet protocols, power line communication (PLC) protocols, and/or the like. In some embodiments, facilitation of communication for the secure computing environment 125 may include transforming and/or translating data from a first communication protocol to a second communication protocol. In some embodiments, network protocol subsystem 248 may determine and/or monitor an amount of data traffic to determine which network protocol is to be used for establishing a secure communication connection, transmitting data, and/or performing retrieval and subsequent visualization of structured data.

The application programming interface (API) gateway 250 may allow other devices and/or computing environments and/or applications external to the secure computing environment 125 to access the API 230 of the memory 204. For example, a computing system may access the API 230 of the secure computing environment 125 via the API gateway 250. In some embodiments, API gateway 250 may be required to validate user credentials associated with a user of a computing device (e.g., a device external to the secure computing environment 125) prior to providing access to the API 230 to the user. API gateway 250 may include instructions for the secure computing environment 125 and thereby communicate with external devices and/or between components of the secure computing environment 125.

The encryption engine 252 may facilitate translation, encryption, encoding, decryption, and/or decoding of information received, transmitted, and/or stored by the secure computing environment 125. Using encryption engine 252, each transmission of data may be encrypted, encoded, and/or translated for security reasons, and any received data may be encrypted, encoded, and/or translated prior to its processing and/or storage. In some embodiments, encryption engine 252 may generate an encryption key, an encoding key, a translation key, and/or the like, which may be transmitted along with any data content.

The communication device 254 may include a variety of hardware and/or software specifically purposed to facilitate communication for secure computing environment 125 with external systems and/or devices. In some embodiments, communication device 254 may include one or more radio transceivers, chips, analog front end (AFE) units, antennas, processing units, memory, other logic, and/or other components to implement communication protocols (wired or wireless) and related functionality for facilitating communication for system 125. Additionally and/or alternatively, communication device 254 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

User Interfaces

In performing the operations shown in FIGS. 3-11, the example interfaces described herein may communicate with data cloud server 105 to access information either from the data cloud server 105 or the external source 112. The example interfaces described herein may be implemented on the secure computing environment 125 or alternatively on even a separate server/computer system coupled to network 110. Moreover, the example user interfaces described herein may utilize the communication resources of the secure computing environment 125 described herein to communicate with data cloud server 105. In addition, example user interfaces described in FIGS. 3-20 may utilize the communication resources of the separate server/computer system to communicate with data cloud server 105.

FIG. 3 shows an example interface 300 used to devise a new case to be stored in data could server 105, according to one embodiment. The example interface 300 may be used to input the necessary fields 304-332 to define a new case for retrieval purposes. A details box 302 may be provided, allowing a user to input the fields 304-332. The case number field 304 may be a unique number used to identify a particular case. A user may reference case number field 304 to directly access information from data cloud server 105 associated with the case. The adverse event report (AER) field 306 may be a unique number associated with a particular reporting of an adverse event related to case number 304. The report type field 310 may define the type of report associated with the case number 304. The receipt data field 312 may define the date of receipt of the information being relied upon by case number 304. The due date field 314 may state the due date the case number 304 should be processed or aggregated as part of a report.

Also, the source document field 316 may be associated with a document or reference information used by case number 304. In some implementations, the source document field 316 may be an address location for accessing the document or reference information. In some implementations, the source document field 316 may be an actual document or reference material uploaded by the user to data cloud server 105. The version field 318 may allow a user to designate a version number for case number 304 specifically. Case number 304 may include more than one version. The watchlist tag fields 320 may tag case number 304 to specific terms or other elements. When a user performs a search using the specific terms or other elements, case number 304 should appear in the search results or watchlists.

Moreover, the event field 322 may connect an event to case number 304. The seriousness field 324 defines the seriousness of the event. Example interface 30 may provide a drop-down menu in some implementations defining a set of seriousness elements a user can select as input to seriousness field 324. In some implementations, a user may selectively write in a text box the seriousness field 324. The expectedness field 326 may be used to define the expectedness of the event of case number 304, may be entered via Yes or No checkboxes. The relatedness field 328 may include a drop-down menu defining a set of relatedness elements a user can select as input to relatedness field 328. In some implementations, a user may selectively write in a text box the relatedness field 328. The expedited field 330 may be used to define the expedited nature of case number 304, and may be entered via Yes or No checkboxes. The Council for International Organizations of Medical Sciences CIOMS) remarks field 332 may be used to comment on the CIOMS report if available.

The suppression field 321 may be selected by checking a checkbox. When this occurs, case number 304 may now be suppressed for submissions and exclusion in reports. A user may have many reason to suppress a submission including the following: (1) Cases that were entered in error; or (2) Cases that do not need to be submitted, but can be useful for other purposes (signals, analysis for aggregates). When a suppression field 321 has been checked, data cloud server 105 may store a marker identifying the respective case as being suppressed from submission.

FIG. 4 shows an example interface 400 listing all cases including their corresponding content information, according to one embodiment. Example interface 400 may include a table listing 402 detailing all the cases and their respective content information. In particular, table listing 402 lists in columns the following content information fields for each case: Name N1-N5; Lifecycle state L1-L5; Suppress Submission fields Supp1-Supp5; Approval Date AD1-AD5; Due Date DD1-DD5; Receipt Date RD1-RD5; New Info Date NID1-NID5; Report Type RT1-RT5; Study ST1-ST5; Product P1-P5, Event E1-E5; Seriousness SR1-SR5; and Relatedness R1-R5.

Example interface 300 may provide most of the information listed in table listing 402 for each case. However, the following fields are not provided by example interface 300: Name N1-N5; Lifecycle State L1-L5; Study ST1-ST5; and Product P1-P5. These fields may be inputted using other means, such as a separate window for input by the user, or are automatically generated/populated by data cloud server 105. The Name N1-N5 for each case may include its corresponding case number and version. In some implementations, the user may add additional text for each Name N1-N5 besides the case number and version. Data cloud server 105 may identity the Name N1-N5 to a particular case, including all content information for retrieval purposes. The Lifecycle state of a case number may be based on several predefined state information, which the data cloud server 105 may automatically update when a case's Lifecycle state has changed.

The leftmost portion of example interface 400 includes a listing of the following: View field 404; Recent Cases field 404b; and Favorites field 404c. When fields 404, 404b, and 404c is clicked by the user, a select number of cases are displayed in table listing 402. For example, view field 404 may allow the user to view all the cases as stored in data cloud server 105. While Recent Cases field 404b may allow a user to view recently viewed cases from the past couple of days. The Favorites field 404c may allow a user to view their more actively viewed cases in table listing 402.

Filter panel 406 may include several fields 406a-406h used to filter the number of cases shown in table listing 402. Filter panel 406 may include the following fields:

Due Date field 406a
Receipt Date field 406b
New Info Date field 406c
Report Type field 406d
Study field 406e
Product 406f
Seriousness field 406g
Relatedness field 406h Note the fields 406a-406h correspond to specific fields in table listing 402. Filter panel 406 may allow a user to click one or more of the fields 406a-406h and input specific information for the one or more fields that the user clicked for filtering the cases to be viewed in table listing 402.

Figure 5:
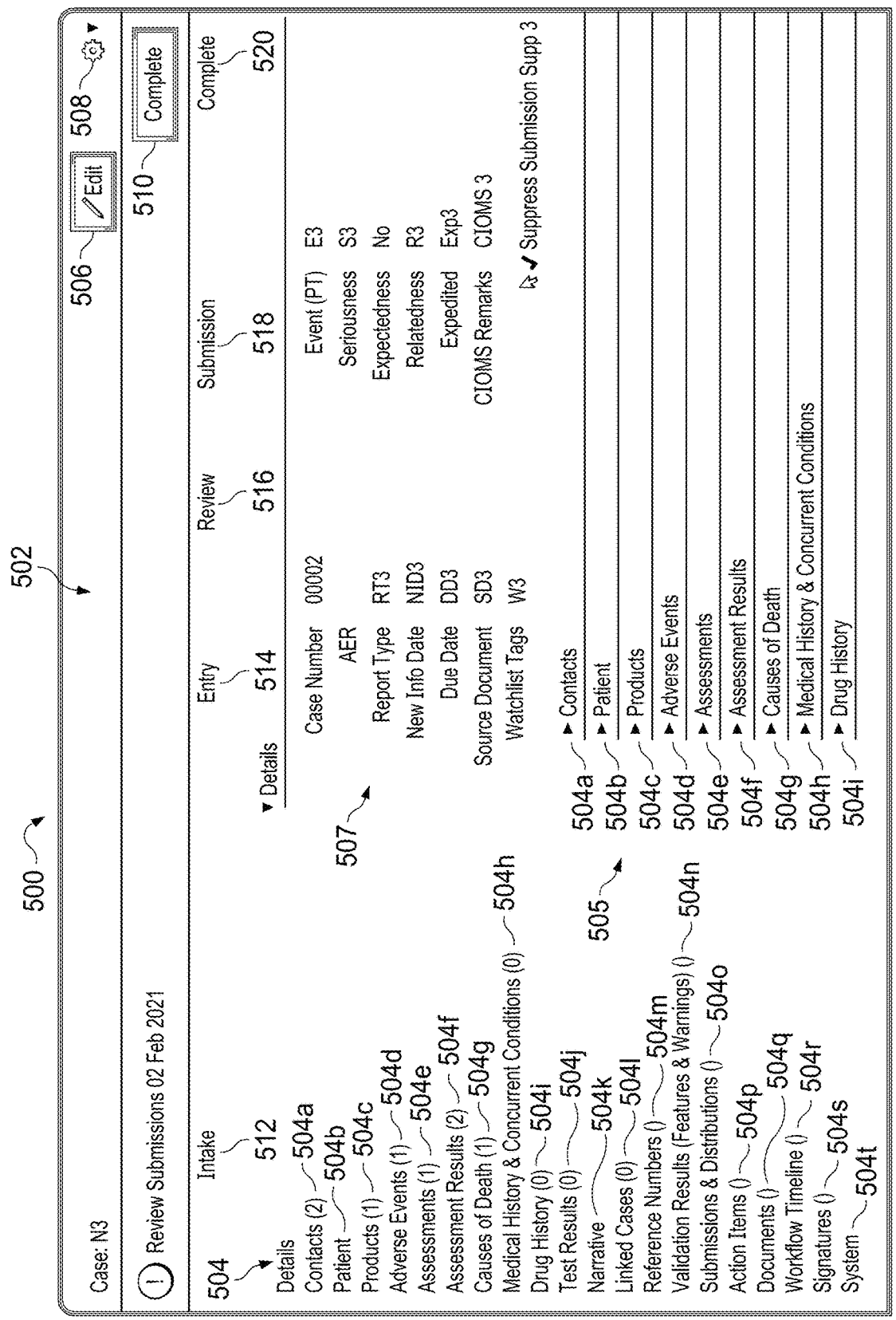
FIG. 5 shows an example interface illustrating a detailed view of a case listed in example interface of FIG. 4, according to one embodiment.

FIG. 5 shows an example interface 500 illustrating a detailed view of a case listed in example interface 400, according to one embodiment. Example interface 500 may appear when the user clicks on case name N3 in example interface 400. In particular, example interface 500 may provide the user more detailed information regarding the case N3. Example interface 500 may include listing portion 502 that shows detailed information of case N3. The leftmost region of listing portion 502 includes a Details panel 504 having fields 504a-504t. The region 505 of listing portion 502 also includes fields 504a-504t, but here the use may click a drop-down menu providing more detailed information for each field 504a-504t. Also, when a user clicks one of the fields 504a-504t in the leftmost region, the user may be directed to the specific clicked field 504a-504t in region 505 to access the clicked field's detailed information. Region 505 may not show all the fields 504a-504t together, but the user may scroll down to see the other remaining field 504a-504t.

Fields 504a-504t may include the following fields: Contact 504a; Patient 504b; Products 504c; Adverse Events 504d; Assessments 504e; Assessment Results 504f; Causes of Death 504g; Medical History and Concurrent Conditions 504h; Drug History 504i; Test Results 504j; Narrative 504k; Linked Cases 504l; Reference Numbers 504m; Validation Results 504n; Submissions and Distributions 504o; Action Items 504p; Documents 504q; Workflow Timelines 504r; Signatures 504s; and System 504t.

Region 507 of listing portion 502 may show a number of case N3's content information as listed in example interfaces 300 and 400 as follows: Report Type RT3; Receipt Date RD3; New Info Date NID3; Due Date D3; Source Document SD3; Watchlist tag W3; Event E3; Seriousness S3; Expecteness Ex3; Relatedness R3; Expedited Exp3; and CIOMS Remarks CIOMS3; and Suppress submission checkbox Supp3.

Example interface 500 may show the lifecycle states of case N3 via listing portion 502 as follows: Intake 512; Entry 514; Review 516; Submission 518; and Complete 520. The intake state 512 may generally be associated with the initial step putting information for a case. The entry state 514 may be associated with completely putting all information for a case and storing the case information in data cloud server 105. The review state 516 may involve professionals reviewing case information and determining if all information is properly added. The submission state 518 may involve professionals reviewing one final time the case information to determine it is ready for submission for report generation. The complete state 520 may be initiated when a case has completed all the previous states without issue by pressing button 510.

The edit button 506 may allow a user to update information shown in listing portion 502 while button 508 may allow a user to preview various reports using case N3 or update information needed for report generation.

Figure 6:
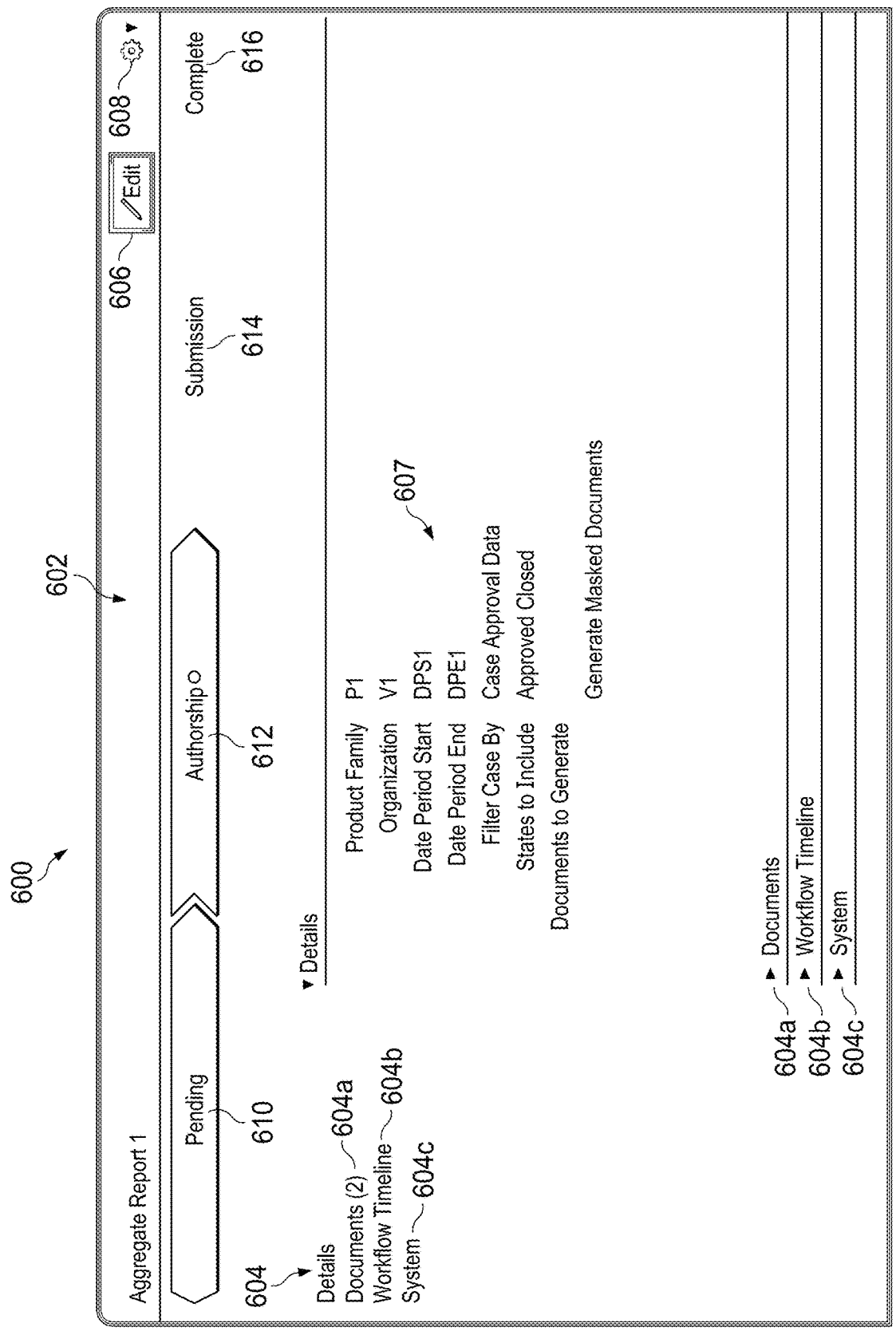
FIG. 6 shows an example interface for generating an aggregate report, according to one embodiment.

FIG. 6 shows an example interface 600 for generating an aggregate report, according to one embodiment. Example interface 600 may include listing portion 602 that shows detailed information of needed to devise Aggregate Report 1. The leftmost region of listing portion 602 includes a Details panel 604 having fields 604a-604c. The region of listing portion 602 also includes fields 604a-604c, but here the user may click a drop-down menu providing more detailed information for each field 604a-604c. Also, when a user clicks one of the fields 604a-604c in the leftmost region, the user may be directed to the specific clicked field 604a-604c in region to access the clicked field's detailed information.

Fields 604a-604c may include the following fields: Documents 604a; Workflow Timeline 604b; and System 604c. Fields 604a-604c may include the same information as fields 504q, 504r, and 504t of example interface 500.

Region 607 of listing portion 602 may shows information needed for generating Aggregate Report 1 as follows: Product Family PF1; Organization V1; Date Period Start DPS1; Date Period End DPE1; Filter Case by F1; and States to be included STB1. Aggregate Report 1 may generate a report using cases shown in example interface 400. To retrieve the appropriate cases for report generation may require defining the fields Date Period Start DPS1, Date Period End DPE1; Filter Case by F1, and States to be included STB1 so the cases meeting the criteria of these fields are retrieved by data cloud server 105.

Example interface 600 may show the lifecycle states of Aggregate Report 1 via listing portion 602 as follows: Pending 610; Authorship 612; Submission 614; and Complete 616. The pending state 610 may generally be associated with the initial step of data cloud server 105 retrieving information for generating Aggregate Report 1. The authorship state 612 may involve authors of Aggregate Report 1 reviewing case information and determining if all information is properly added. The submission state 614 may involve authors of Aggregate Report 1 reviewing one final time the case information to determine it is ready for submission for report generation. The complete state 616 may be initiated when a case has completed all the previous states without issue.

The edit button 606 may allow a user to update information shown in listing portion 602 while button 608 may allow a user to preview various aggregate reports or update information needed for generating Aggregate Report 1.

Figure 7:
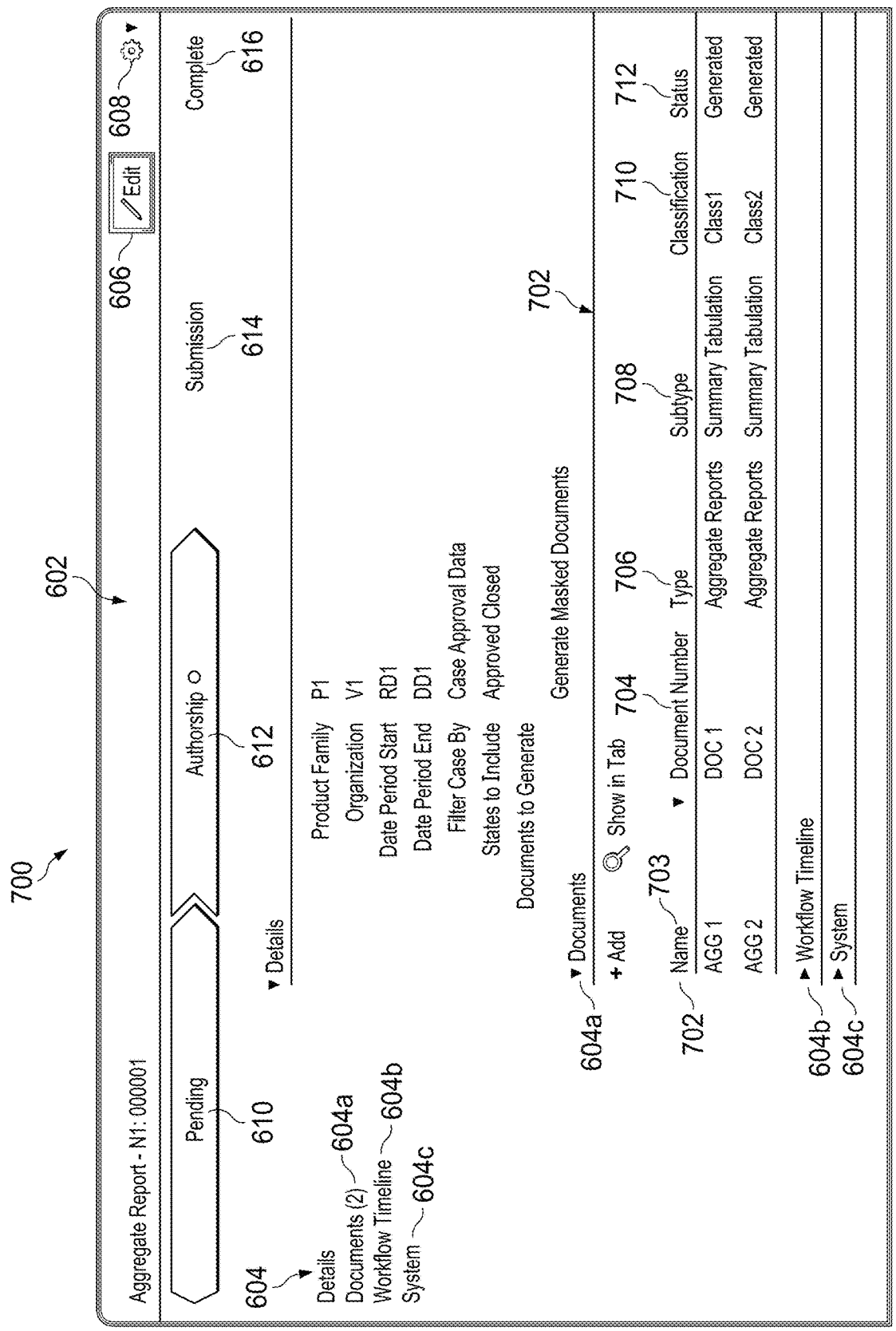
FIG. 7 shows an example interface for accessing an aggregate report, according to one embodiment.

FIG. 7 shows an example interface 700 for accessing an aggregate report, according to one embodiment. Example interface 700 is similar to example interface 600. The key difference lies in accessing aggregate documents produced using example interface 600. When a user clicks on document field 604 in region 605 a drop-down table 702 may be provided. The drop-down table 702 may include a number of fields 703-712 arranged in columns as follows: Name field 703; Document Number field 704; Type field 706; Subtype field 708; Classification field 710; and Status field 712.

The name field name 703 may define the names of the documents AGG1 and AGG2 produced using the parameters described in example interface 600. In some implementations, the name field 703 may be defined by the user or automatically generated by the data cloud server 105. The document number field 704 may define unique numbers DOC1 and DOC2 assigned to documents AGG1 and AGG2. In some implementations, the unique numbers may be automatically generated by the data cloud server 105.

Also, the type field 706 may define the type of report for each document AGG1 and AGG2. In this case, the documents AGG1 and AGG2 are aggregate reports as indicated by their respective type field 706, however, other report types may be used. The subtype field 708 may define the subtype for each document AGG1 and AGG2. In this case, the documents AGG1 and AGG2 are presented in a summary tabulation format as indicated by their respective subtype fields 708, however, other subtypes may be used.

Moreover, the classification field 710 may define the classification for each document AGG1 and AGG2. In this case, the documents AGG1 and AGG2 are presented to have CLASS1 and CLASS2 classifications as indicated by their respective classification fields 710. The data cloud server 105 may include a number of classification types that may be assigned to documents based on different preset criteria. The status field 712 may define the status for each document AGG1 and AGG2. In this case, the documents AGG1 and AGG2 are presented as been generated as indicated by their respective status fields 712, however, other status types may be used.

Figure 8:
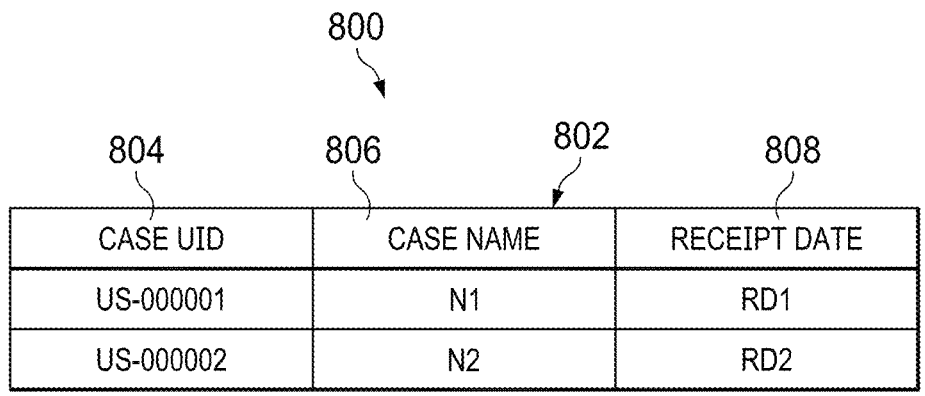
FIG. 8 shows a table listing indicating the specific cases used to generate reports shown in example interface of FIG. 7, according to one embodiment.

FIG. 8 shows a table listing 800 indicating the specific cases used to generate reports shown in example interface 700 of FIG. 7, according to one embodiment. In particular, example interfaces 600 and 700 have a DPS1 date and a DPE1 date where receipt dates RD1 and RD2 of cases N1 and N2 may fall within, as shown in example interface 400. For this reason, cases N1 and N2 were selected for generating Aggregate Report 1. Table listing 800 may include the case number (Case UID) 804, case name 806, and receipt date (RD) 808 for cases N1 and N2.

Figure 9:
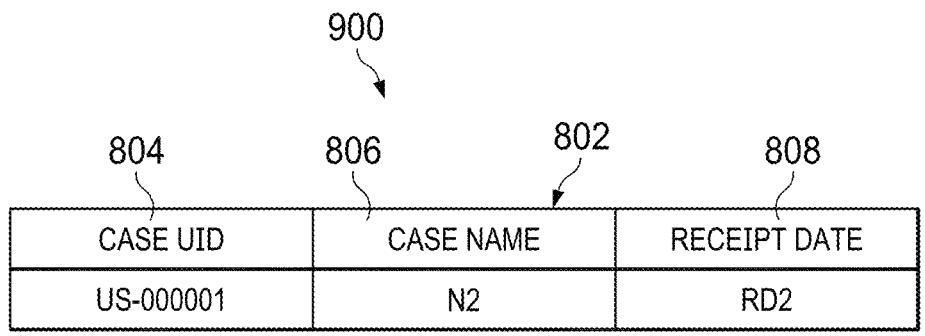
FIG. 9 shows a table listing indicating the specific cases used to generate reports shown in example interface of FIG. 7, according to one embodiment.

FIG. 9 shows a table listing 900 indicating the specific cases used to generate reports shown in example interface 700 of FIG. 7, according to one embodiment. In particular, example interfaces 600 and 700 have a DPS1 date and a DPE1 date where the receipt dates RD2 and RD3 of cases N2 and N3 may fall within, as shown in example interface 400. However, only case N2 was selected for generating Aggregate Report 1. This is due to case N3 having its corresponding suppress submission checkbox Supp3 checked as shown in example interface 500. When the suppress submission checkbox Supp3 of a case is clicked, it will not be submitted for report generation but the case may be stored in data cloud server 105 for later assessment or when the submission checkbox Supp is unchecked. Note table listing 900 is similar to table listing 800.

Figure 10:
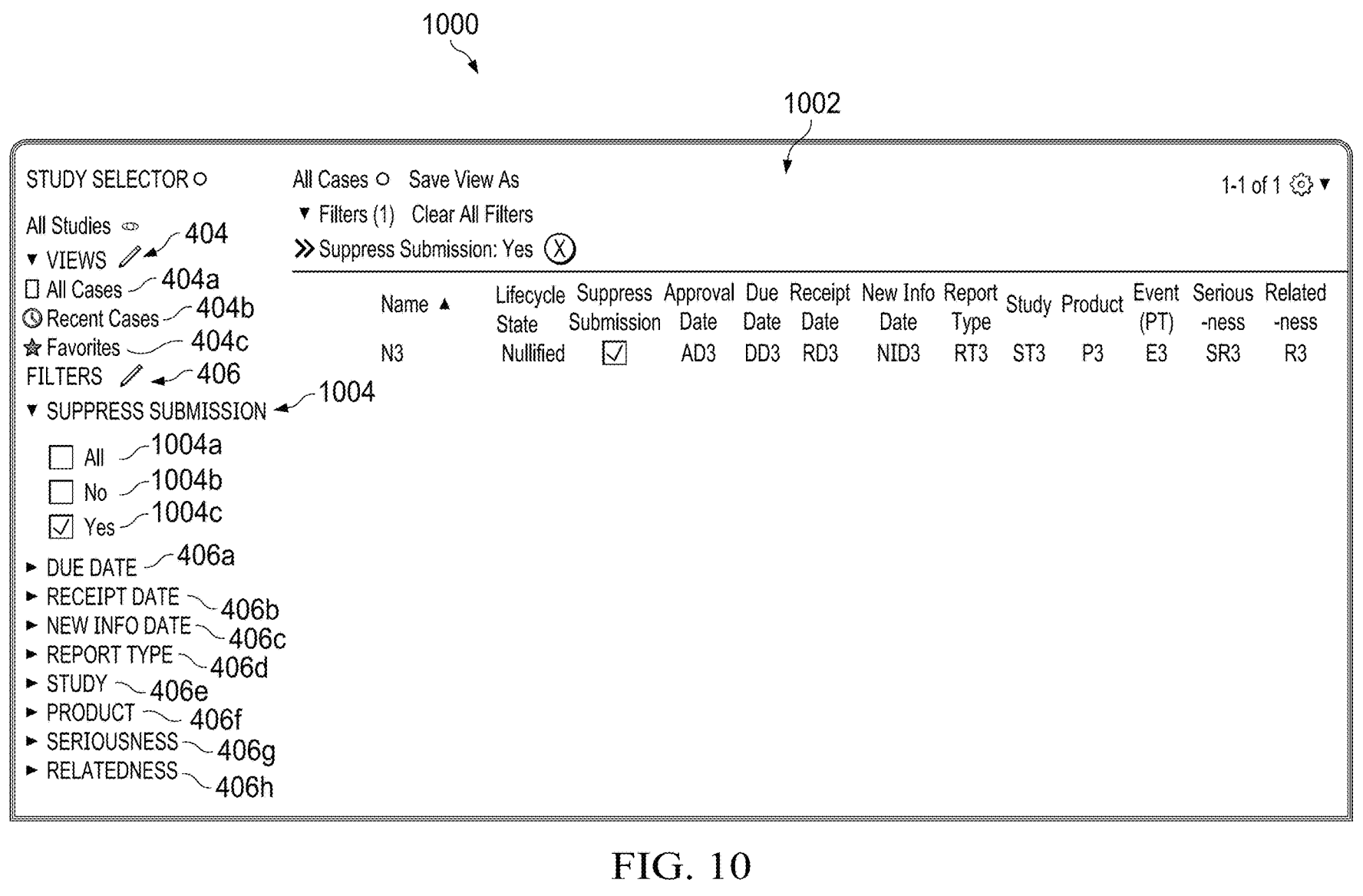

FIG. 10 shows an example interface 1000 for filtering cases using the suppress submission field, according to one embodiment. Example interface 1000 is similar to example interface 400. The key difference is example interface 1000 may allow filtering thru cases using the suppression submission field Supp. In this case, example interface 1000 may include a suppress submission filtering panel 1004. The suppress submission filtering panel 1004 may include the following checkbox fields: All field 1004a; No field 1004b; and Yes field 1004c.

When the user checks the Yes field 1004c, table listing 1002 may be populated with those cases, as shown in example interface 400, having their corresponding suppress submission fields Supp checked, as shown in example interface 500. The table listing 1002 may include the same fields as table listing 402 of example interface 400. In this case, the case N3 was the only case requiring suppress submission and its corresponding content information populates table listing 1002.

When the user checks the No field 1004b, table listing 1002 may be populated with those cases, as shown in example interface 400, having their corresponding suppress submission fields Supp unchecked, as shown in example interface 500. The content information of those cases having unchecked suppress submission fields Supp may populate table listing 1002.

When the user checks the All field 1004a, table listing 1002 may be populated with the same cases as shown in table listing 402. This occurs because the All field 1004a may capture all cases that have checked and unchecked suppress submission fields Supp.

Note to the right of fields 1004b and 1004c are the numbers of cases for each field that meet their respective criteria for filtering. In this circumstance, only one case (N3) require suppress submission and four cases (N1-N2 and N4-N5) do not require suppression submission. This can be confirmed in example interface 400.

Figure 11:
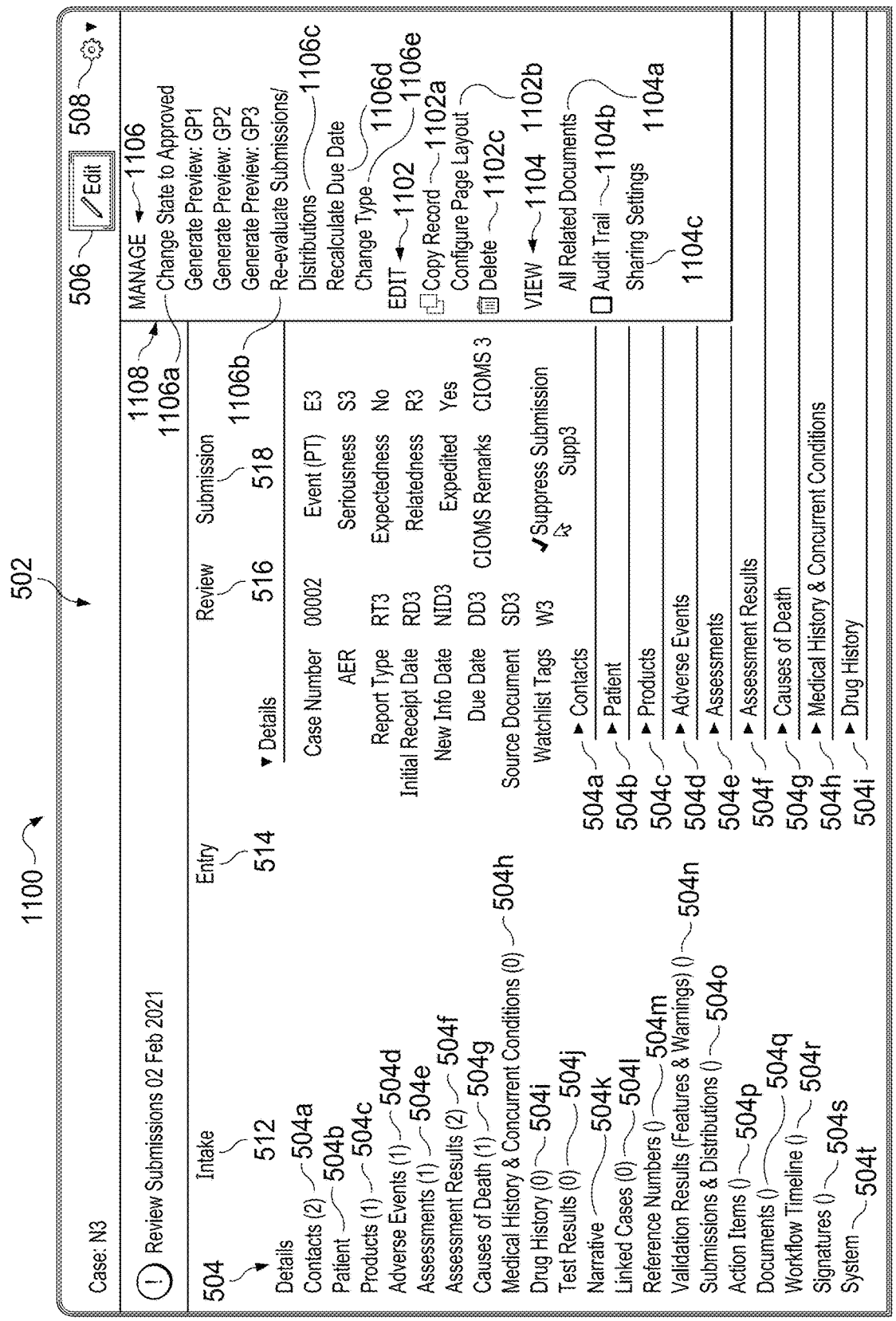
FIG. 11 shows an example interface for sharing a job with another consulting partner/recipient, according to one embodiment.

FIG. 11 shows an example interface for editing and reviewing information of a submitted case. Example interface 1100 is similar to example interface 500. The key difference is example interface 1100 may allow a user to edit and view detailed information of a submitted. When a user clicks the button 508 a drop down menu 1108 is presented that may include the following command options: Edit 1102, View 1104, and Manage 1106. The edit command option 1102 may provide a user a number of editing sub-options 1102a-1102c for editing the submitted case. The edit sub-option 1102a may allow the user to make a copy of the case information, as shown in FIG. 11, and add it to a new case or store it for later use. The edit sub-option 1102b may allow the user to configure the page layout example interface 1100 to their preference. The edit sub-option 1102c may allow the user to delete the current submitted case from the data cloud server 105.

The view command option 1104 may provide a user a number of editing sub-options 1104a-1104c for editing the submitted case. The view sub-option 1104a may allow the user to view all documents related to the submitted case. The view sub-option 1104b may provide the user with an audit trail of the submitted case for purposes of tracking and maintenance. The view sub-option 1104c may allow the user the capabilities to share the submitted case to third parties. In some implementation, a separate user interface may be provided for the user to enter sharing information.

Also, the manage command option 1106 may provide a user a number of manage sub-options 1106a-1106e and general preview sub-options GP1-GP2 for managing the information of the submitted case. The manage sub-option 1106a may allow the user to change the state of the submitted case to approve. The manage command option 1106 may include a number of preview sub-options GP1-GP3 for previewing the case information for submission in different report type formats. The re-evaluate submission sub-option 1106b may allow the user to re-evaluate the case after new information has been provided. The distributions sub-option 1106c may allow the user to select the parties/authorities to send the submission. The recalculate due date sub-option 1106d may permit the user to change due date of a submission for a case. The change type sub-option 1106e may permit the user to the report type of the submission for a case.

Workflow

Figure 12A:
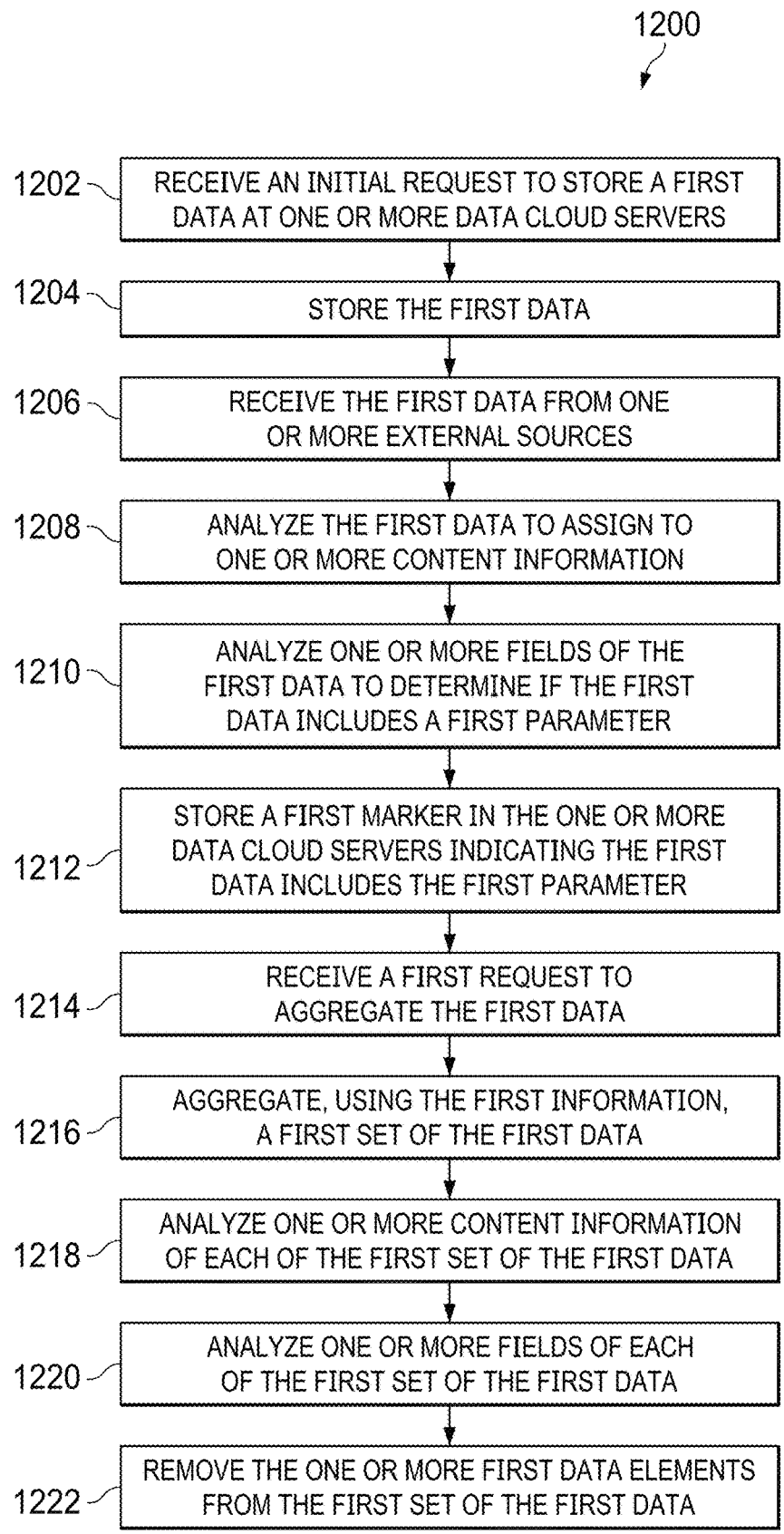
FIGS. 12A-12B show flowcharts illustrating a method for tracking data in a computer network, according to one embodiment.
Figure 12B:
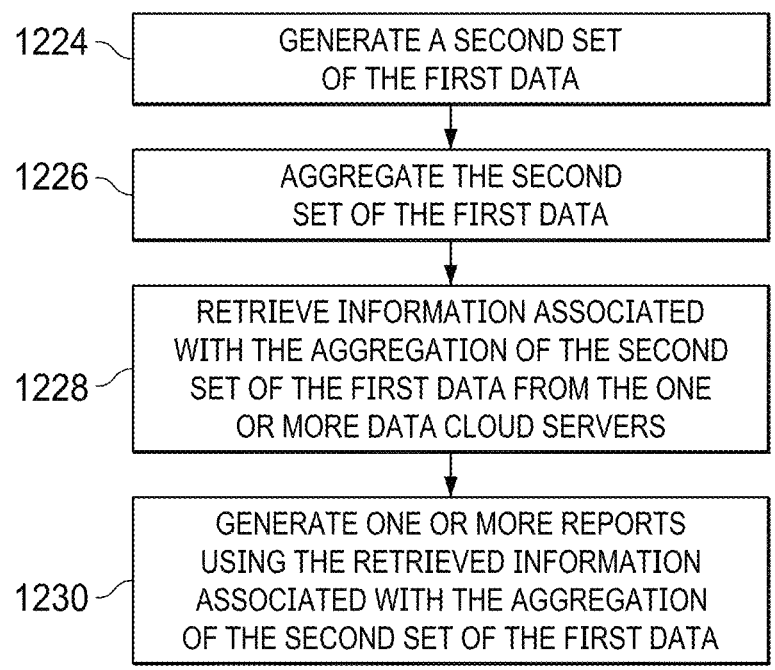

FIGS. 12A-12B show flowcharts 1200 illustrating a method for tracking data in a computer network, according to one embodiment. In block 1202, the method includes receiving, using one or more computing device processors, an initial request to store a first data at one or more data cloud servers, wherein the one or more data cloud servers store the first data. In block 1204, the method includes storing, using the one or more computing device processors, the first data in the one or more data servers. At block 1206, the method includes receiving, using the one or more computing device processors, the first data from one or more external sources. At block 1208, the method includes analyzing, using the one or more computing device processors, the first data to assign to one or more content information. At block 1210, the method includes analyzing, using the one or more computing device processors, one or more fields of the first data to determine if the first data includes a first parameter.

At block 1212, in response to determining the first data includes the first parameter, storing, using the one or more computing device processors, a first marker in the one or more data cloud servers indicating the first data includes the first parameter. The method includes receiving, using the one or more computing device processors, a first request to aggregate the first data, wherein the first request includes a first information for aggregating the first data, as shown at block 1214. Also, the method includes aggregating, using the one or more computing device processors and the first information, a first set of the first data, as shown at block 1216. At block 1218, analyzing, using the one or more computing device processors, one or more content information of each of the first set of the first data to determine the one or more content information of each of the first set of the first data is in accordance with the first information.

At block 1220, the method includes in response to the one or more content information of each of the first set of the first data being in accordance with the first information, analyzing, using the one or more computing device processors, one or more fields of each of the first set of the first data to determine one or more first data elements of the first set include the first parameter. Moreover, the method includes, in response to determining the one or more first data elements of the first set include the first parameter, removing, using the one or more computing device processors, the one or more first data elements from the first set of the first data, as shown at block 1222. Also, the method includes, generating, using the one or more computing device processors, a second set of the first data, wherein the second set of the first data includes one or more first data elements in the first set of the first data that do not include the first parameter, as shown at block 1224.

At block 1226, the method includes aggregating, using the one or more computing device processors and the first information, the second set of the first data. At block 1228, the method includes retrieving, using the one or more computing device processors, information associated with the aggregation of the second set of the first data from the one or more data servers. The method includes generating, using the one or more computing device processors, one or more reports using the retrieved information associated with the aggregation of the second set of the first data, as shown at block 1230.

In some implementations, the one or more data servers may receive the request for accessing the data via a user interface executing on a computing device processor different from the one or computing device processors. In some implementations, the one or more data servers may receive an indication from the user of which of the one or more external sources are used for retrieving the first data.

In some implementations, when analyzing the first data, the one or more data servers receive the content information from the user using a browser base interface. In some implementations, the content information comprises a version of the first data. In some implementations, when analyzing the one or more fields of the first data, the one or more data servers may use parsing tools to parse the one or more fields to determine if the first data includes a suppress submission field.

In some implementations, when storing the first marker in the one or more data servers, the one or more data servers may store the content information of the first data having the first marker in a specific location in the one or more data servers. In some implementations, when receiving a first request to aggregate the first data, the one or more data servers may receive the first request from a user including sending the first information. In some implementations, the first information may include information defining which of the first data is used to generate the one or more reports. In some implementations, when analyzing the one or more content information of each of the first set of the first data, the one or more data servers may include tool for parsing the one or more content information of each the of the first set of the first data is in accordance with the first information.

In some implementations, when generating the second set of the first data, the one or more data servers may store the one or more first data elements in the first set of the first data that include the first parameter. In some implementations, the one or more data servers may review the one or more first data elements in the first set of the first data that include the first parameter for analysis purposes upon a request by a user.

In some implementations, a user interface may be provided for allowing the user to select which of the one or more external sources to retrieve the first data. In some implementations, the user interface may display details of the at least one of the first data. In some implementations, the user interface may update the content information of at least one of the first data. In some implementations, the user interface may display and update information regarding the first information. In some implementations, the user interface may access when the one or more reports are available for viewing by a user. In some instance, the user interface may display which of the first data elements are of the second set of the first data.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances," "in one case," "in some cases," "in one embodiment," or "in some embodiments" in various places in the specification are not necessarily all referring to the same implementation or embodiment. In some embodiments, the terms "signal," "data," and/or "information" may be used interchangeably. In some embodiments, signals refer to non-transitory signals.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Accordingly, the present disclosure is intended to be illustrative, but not limiting, of the scope of the present disclosure, which is set forth in the following claims.

What is claimed is:

1. A method for tracking data in a computer network, the method comprising:
   receiving an initial request to store a first data at one or more data cloud servers;
   determining a first lifecycle state of the first data, wherein the first lifecycle state of the first data is based on state information, and wherein the first lifecycle state of the first data comprises an intake state;
   storing the first data in the one or more data cloud servers;
   determining a first change from the first lifecycle state of the first data to a second lifecycle state of the first data, wherein the second lifecycle state of the first data comprises an entry state;
   receiving the first data from one or more external sources, wherein receiving the first data comprises:
      receiving an indication from a first user of a first external source for receiving the first data,
      communicating with the first external source,
      receiving, at the one or more data cloud servers, the first data,
      receiving a request, from the first user, for access to the first data, and
      in response to granting access to the first data to the first user, enabling the first user to access the first data;
   analyzing the first data to assign to one or more content information;
   determining a second change from the second lifecycle state of the first data to a third lifecycle state of the first data, wherein the third lifecycle state of the first data comprises a first submission state;
   analyzing one or more fields of the first data to determine if the first data includes a first parameter, wherein analyzing the one or more fields of the first data comprises parsing the one or more fields to determine if a first field of the one or more fields is suppressed;
   in response to determining the first data includes the first parameter, storing a first marker in the one or more data cloud servers indicating the first data includes the first parameter;
   determining a third change from the third lifecycle state of the first data to a fourth lifecycle state of the first data, wherein the fourth lifecycle state of the first data comprises a first completion state;
   receiving a first request to aggregate the first data, wherein the first request includes a first information for aggregating the first data;
   aggregating, based on the first information, a first set of the first data;
   analyzing one or more content information of each of the first set of the first data to determine the one or more content information of each of the first set of the first data is in accordance with the first information;
   in response to the one or more content information of each of the first set of the first data being in accordance with the first information, analyzing one or more fields of each of the first set of the first data to determine one or more first data elements of the first set include the first parameter;
   in response to determining the one or more first data elements of the first set include the first parameter, removing the one or more first data elements from the first set of the first data;
   generating or determining a second set of the first data, wherein the second set of the first data includes one or more second data elements in the first set of the first data that do not include the first parameter;
   aggregating, based on the first information, the second set of the first data;
   retrieving information associated with the aggregation of the second set of the first data from the one or more data cloud servers, wherein the retrieved information comprises a second parameter, a third parameter, a fourth parameter and a fifth parameter, wherein the second parameter comprises a date period start, the third parameter comprises a date period end, the fourth parameter comprises a filtering parameter, and the fifth parameter comprises the state information;
   generating one or more reports based on the retrieved information associated with the aggregation of the second set of the first data;
   determining a fifth lifecycle state of the one or more reports, wherein the fifth lifecycle state of the one or more reports comprises a pending state;
   determining a fourth change from the fifth lifecycle state of the one or more reports to a sixth lifecycle state of the one or more reports, wherein the sixth lifecycle state of the one or more reports comprises an authorship or second submission state; and
   determining a seventh change from the sixth lifecycle state of the one or more reports to a seventh lifecycle state of the one or more reports, wherein the seventh lifecycle state of the first data comprises a second completion state.

2. The method of claim 1, wherein analyzing the first data comprises receiving the one or more content information from a second user interacting with an interface.

3. The method of claim 2, wherein the one or more content information comprises a version of the first data.

4. The method of claim 3, wherein analyzing the one or more fields of the first data comprises parsing the one or more fields to determine if a suppress submission field is present.

5. The method of claim 1, wherein storing the first marker in the one or more data cloud servers comprises storing the one or more content information of the first data having the first marker in a location in the one or more data cloud servers.

6. The method of claim 1, wherein receiving the first request to aggregate the first data comprising receiving the first request from a second user.

7. The method of claim 6, wherein the first information comprises second information defining which of the first data is used to generate the one or more reports.

8. The method of claim 1, wherein analyzing the one or more content information of each of the first set of the first data comprise parsing the one or more content information of each of the first set of the first data is in accordance with the first information.

9. The method of claim 1, further comprising providing a drop-down table for accessing the one or more reports based on a name field, a document data field, a classification field, and a status field.

10. A system for tracking data in a computer network, the system comprising:
one or more computing device processors; and
one or more computing device memories, coupled to the one or more computing device processors, the one or more computing device memories storing instructions executed by the one or more computing device processors, wherein the instructions are configured to:
receive an initial request to store a first data at one or more data cloud servers;
determine a first lifecycle state of the first data, wherein the first lifecycle state of the first data is based on state information, and wherein the first lifecycle state of the first data comprises an intake state;
store the first data in the one or more data cloud servers;
determine a first change from the first lifecycle state of the first data to a second lifecycle state of the first data, wherein the second lifecycle state of the first data comprises an entry state;
receive the first data from one or more external sources, wherein
receive the first data comprises:
receive an indication from a first user of a first external source for receiving the first data,
communicate with the first external source,
receive, at the one or more data cloud servers, the first data,
receive a request, from the first user, for access to the first data, and
in response to granting access to the first data to the first user, enable the first user to access the first data;
analyze the first data to assign to one or more content information;
determine a second change from the second lifecycle state of the first data to a third lifecycle state of the first data, wherein the third lifecycle state of the first data comprises a first submission state;
analyze one or more fields of the first data to determine if the first data includes a first parameter, wherein analyze the one or more fields of the first data comprises parse the one or more fields to determine if a first field of the one or more fields is suppressed;
in response to determining the first data includes the first parameter, store a first marker in the one or more data cloud servers indicating the first data includes the first parameter;
determine a third change from the third lifecycle state of the first data to a fourth lifecycle state of the first data, wherein the fourth lifecycle state of the first data comprises a first completion state;
receive a first request to aggregate the first data, wherein the first request includes a first information for aggregating the first data;
aggregate, based on the first information, a first set of the first data;
analyze one or more content information of each of the first set of the first data to determine the one or more content information of each of the first set of the first data is in accordance with the first information;
in response to the one or more content information of each of the first set of the first data being in accordance with the first information, analyze one or more fields of each of the first set of the first data to determine one or more first data elements of the first set include the first parameter;
in response to determining the one or more first data elements of the first set include the first parameter, remove the one or more first data elements from the first set of the first data;
generate or determine a second set of the first data, wherein the second set of the first data includes one or more second data elements in the first set of the first data that do not include the first parameter;
aggregate, based on the first information, the second set of the first data;
retrieve information associated with the aggregation of the second set of the first data from the one or more data cloud servers, wherein the retrieved information comprises a second parameter, a third parameter, a fourth parameter and a fifth parameter, wherein the second parameter comprises a date period start, the third parameter comprises a date period end, the fourth parameter comprises a filtering parameter, and the fifth parameter comprises the state information;
generate one or more reports based on the retrieved information associated with the aggregation of the second set of the first data;
determine a fifth lifecycle state of the one or more reports, wherein the fifth lifecycle state of the one or more reports comprises a pending state;
determine a fourth change from the fifth lifecycle state of the one or more reports to a sixth lifecycle state of the one or more reports, wherein the sixth lifecycle state of the one or more reports comprises an authorship or second submission state; and
determine a seventh change from the sixth lifecycle state of the one or more reports to a seventh lifecycle state of the one or more reports, wherein the seventh lifecycle state of the first data comprises a second completion state.

11. The system of claim 10, wherein the instructions are further configured to provide a user interface for displaying details of the first data.

12. The system of claim 10, wherein the instructions are further configured to provide a user interface for updating the content information of the first data.

13. The system of claim 10, wherein the instructions are further configured to provide a user interface for displaying and updating the first information.

14. The system of claim 10, wherein the instructions are further configured to provide a user interface for accessing when the one or more reports are available for viewing by a second user.

15. The system of claim 10, wherein the instructions are further configured to provide a user interface for displaying which of the one or more first data elements are of the second set of the first data.

16. A method for tracking data in a computer network, the method comprising:
- receiving an initial request to store a first data at one or more data cloud servers;
- determining a first lifecycle state of the first data, wherein the first lifecycle state of the first data is based on state information, and wherein the first lifecycle state of the first data comprises an intake state;
- storing the first data at the one or more data cloud servers;
- determining a first change from the first lifecycle state of the first data to a second lifecycle state of the first data, wherein the second lifecycle state of the first data comprises an entry state;
- receiving the first data from one or more external sources, wherein receiving the first data comprises:
  - receiving an indication from a first user of a first external source for receiving the first data,
  - communicating with the first external source,
  - receiving, at the one or more data cloud servers, the first data,
  - receiving a request, from the first user, for access to the first data, and
  - in response to granting access to the first data to the first user, enabling the first user to access the first data;
- analyzing the first data to assign to one or more content information;
- determining a second change from the second lifecycle state of the first data to a third lifecycle state of the first data, wherein the third lifecycle state of the first data comprises a first submission state;
- analyzing one or more fields of the first data to determine if the first data includes a first parameter, wherein analyzing the one or more fields of the first data comprises parsing the one or more fields to determine if a first field of the one or more fields is suppressed;
- in response to determining the first data includes the first parameter, storing a first marker in the one or more data cloud servers indicating the first data includes the first parameter;
- determining a third change from the third lifecycle state of the first data to a fourth lifecycle state of the first data, wherein the fourth lifecycle state of the first data comprises a first completion state;
- receiving a first request to aggregate the first data, wherein the first request includes a first information for aggregating the first data;
- aggregating, based on the first information, a first set of the first data;
- analyzing one or more content information of each of the first set of the first data to determine the one or more content information of each of the first set of the first data is in accordance with the first information;
- in response to the one or more content information of each of the first set of the first data being in accordance with the first information, analyzing one or more fields of each of the first set of the first data to determine one or more first data elements of the first set include the first parameter;
- in response to determining the one or more first data elements of the first set include the first parameter, removing the one or more first data elements from the first set of the first data;
- generating or determining a second set of the first data, wherein the second set of the first data includes one or more second data elements in the first set of the first data that do not include the first parameter;
- aggregating, based on the first information, the second set of the first data;
- retrieving information associated with the aggregation of the second set of the first data from the one or more data cloud servers, wherein the retrieved information comprises a second parameter, a third parameter, a fourth parameter and a fifth parameter, wherein the second parameter comprises a date period start, the third parameter comprises a date period end, the fourth parameter comprises a filtering parameter, and the fifth parameter comprises the state information;
- generating one or more reports based on the retrieved information associated with the aggregation of the second set of the first data;
- determining a fifth lifecycle state of the one or more reports, wherein the fifth lifecycle state of the one or more reports comprises a pending state;
- determining a fourth change from the fifth lifecycle state of the one or more reports to a sixth lifecycle state of the one or more reports, wherein the sixth lifecycle state of the one or more reports comprises an authorship or second submission state; and
- determining a seventh change from the sixth lifecycle state of the one or more reports to a seventh lifecycle state of the one or more reports, wherein the seventh lifecycle state of the first data comprises a second completion state.

17. The method of claim 16, wherein generating the second set of the first data comprises storing the one or more first data elements in the first set of the first data that include the first parameter.

18. The method of claim 16 further comprising reviewing the one or more first data elements in the first set of the first data that include the first parameter upon a request by a second user.

* * * * *